US008131742B2

(12) United States Patent
Stellhorn et al.

(10) Patent No.: US 8,131,742 B2
(45) Date of Patent: Mar. 6, 2012

(54) METHOD AND SYSTEM FOR PROCESSING FRAUD NOTIFICATIONS

(75) Inventors: David W. Stellhorn, Iron Station, NC (US); Brandee L. Bunton, Charlotte, NC (US); David Andersen, Charlotte, NC (US); Jeffrey Chatfield Laughton, Charlotte, NC (US); Emerson D. Miller, Charlotte, NC (US); Lorettajean Cross Maguire, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 311 days.

(21) Appl. No.: 11/957,346

(22) Filed: Dec. 14, 2007

(65) Prior Publication Data

US 2009/0157675 A1 Jun. 18, 2009

(51) Int. Cl.
*G06F 17/30* (2006.01)
(52) U.S. Cl. ...................................................... 707/758
(58) Field of Classification Search .................. None
See application file for complete search history.

(56) References Cited

U.S. PATENT DOCUMENTS

| 7,930,289 | B2* | 4/2011 | Cheshire ........................ 707/709 |
| 2005/0257261 | A1* | 11/2005 | Shraim et al. .................... 726/22 |
| 2006/0010210 | A1* | 1/2006 | Keller ............................ 709/206 |
| 2006/0080437 | A1 | 4/2006 | Lake |
| 2006/0168066 | A1 | 7/2006 | Helsper et al. |
| 2006/0253584 | A1 | 11/2006 | Dixon et al. |
| 2007/0039038 | A1* | 2/2007 | Goodman et al. ................. 726/2 |
| 2007/0299915 | A1* | 12/2007 | Shraim et al. .................. 709/206 |

OTHER PUBLICATIONS

International Search Report and Written Opinion for International Application No. PCT/US08/86783, mailed Apr. 22, 2009, 7 pages. Written Opinion dated Jul. 20, 2011.

* cited by examiner

*Primary Examiner* — Belinda Xue
(74) *Attorney, Agent, or Firm* — Banner & Witcoff, Ltd.

(57) ABSTRACT

Methods and systems for processing fraud notifications allow an organization to classify, monitor, and shut down fraudulent websites. A system may receive reports of suspicious network sites via electronic mail, and parse such reports in order to obtain one or more attributes (e.g., an address) corresponding to the suspicious network sites. In addition, information related to these suspicious network sites may be stored in a database, and algorithms may be used in order to classify, monitor, and respond to a particular suspicious network site. Before responding to a suspicious network site, such a website may first be classified as legitimate, fraudulent or ignore. If the suspicious network site is classified as legitimate or ignore, further action might not be needed. If, however, the suspicious network site is classified as fraudulent, the fraudulent website may be monitored and further action may be taken.

18 Claims, 13 Drawing Sheets

| ID | First Available | Last Available | Count | |
|---|---|---|---|---|
| 471145 | 10/19/2007 10:02:00 AM | 10/19/2007 10:31:00 AM | (4) | http://URL1 |
| 471161 | 10/19/2007 10:15:00 AM | 10/19/2007 10:43:00 AM | (2) | http://URL2 |
| 471098 | 10/19/2007 9:05:00 AM | 10/19/2007 10:44:00 AM | (2) | http://URL3 |
| 471199 | 10/19/2007 10:35:00 AM | 10/19/2007 10:45:00 AM | (2) | http://URL4 |
| 471135 | 10/19/2007 9:42:00 AM | 10/19/2007 10:07:00 AM | (2) | http://URL5 |
| 471162 | 10/19/2007 10:15:00 AM | 10/19/2007 10:43:00 AM | (2) | http://URL6 |
| 471217 | 10/19/2007 10:40:00 AM | 10/19/2007 10:40:00 AM | (1) | http://URL7 |
| 471244 | 10/19/2007 10:58:00 AM | 10/19/2007 10:58:00 AM | (1) | http://URL8 |
| 471151 | 10/19/2007 10:06:00 AM | 10/19/2007 10:06:00 AM | (1) | http://URL9 |
| 471153 | 10/19/2007 10:06:00 AM | 10/19/2007 10:06:00 AM | (1) | http://URL10 |
| 471158 | 10/19/2007 10:15:00 AM | 10/19/2007 10:15:00 AM | (1) | http://URL11 |
| 394434 | 9/21/2007 9:29:00 PM | 9/21/2007 9:29:00 PM | (1) | http://URL12 |
| 394473 | 9/21/2007 9:51:00 PM | 9/21/2007 9:51:00 PM | (1) | http://URL13 |

FIG. 5

METHOD AND SYSTEM FOR PROCESSING FRAUD NOTIFICATIONS

BACKGROUND

With the growth of online transactions, organizations that provide online services must protect their customers from an increasing threat of fraud and identity theft. A growing concern for such organizations is the practice of "phishing," which involves tricking a user into visiting a fraudulent website that appears to be a legitimate website, and then soliciting personal information from the user. Thus, the user may be fooled into giving away personal information such as his or her name, address, social security number, account number, password, and/or Personal Identification Number (PIN) via the fraudulent website. This personal information may then be used by the operators of the fraudulent website or others to steal the user's identity and/or make purchases under the user's name and account. In addition, the longer that any one particular fraudulent website is online, the greater the number of users it may be able to defraud.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A method and system for processing fraud alerts and identifying fraudulent sites allows an organization to classify, monitor, and shut down fraudulent site such as websites in an efficient manner. A system for combating online fraud may include computer servers that receive reports of suspicious sites via electronic mail, and parse such reports in order to obtain addresses corresponding to such sites. In addition, information related to these suspicious sites may be stored in a database, and algorithms may be used to classify, monitor, and respond to a particular suspicious phishing site. These algorithms may include statistical analysis, regular expressions, and/or other rule-based analysis. Before responding to a suspicious site, such a site may first be classified as legitimate or fraudulent. If the suspicious site is classified as legitimate, it might not be necessary to take further action. On the other hand, if the suspicious site is classified as fraudulent, the fraudulent site may then be monitored and further action, such as sending a cease and desist letter to the owner of the IP address corresponding to the fraudulent site or an owner of the domain, may be taken.

According to one aspect, an electronic message that indicates an address of a suspicious site may be received by a processing server. The processing server may determine the address of the suspicious site by parsing the electronic message, determining if the suspicious site corresponds to an address already stored in a database, determining if the site has been previously investigated, and classifying the suspicious site based on a fraudulence-probability assessment. For example, a site may be classified by comparing attributes of the suspicious site with one or more classification criteria such as expression matching, misspellings, domain names and the like. The suspicious site may be classified as legitimate, fraudulent, or ignored. In addition, the fraudulence-probability assessment may be based upon statistical analysis, regular expressions, and/or other rule-based analysis, as applied to the source code and/or linked content of the suspicious site, and may also be based upon analysis of other fraudulent sites, historical data, and/or information relating to or provided by the suspicious site's service provider.

According to one or more aspects, the system may include a user interface that allows a backend user to manually override one or more automatic processes, and/or extract information that results from the execution of such processes. In addition, the user interface may allow the analyst to interact with one or more back office servers that may function in combination.

BRIEF DESCRIPTION OF THE DRAWINGS

The foregoing Summary of the claimed subject matter, as well as the following Detailed Description of illustrative embodiments, is better understood when read in conjunction with the accompanying drawings, which are included by way of example, and not by way of limitation, with regard to the claimed subject matter.

FIG. 5 illustrates a user interface displaying an export listing that allows a user to export a listing of suspicious websites to a data file according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
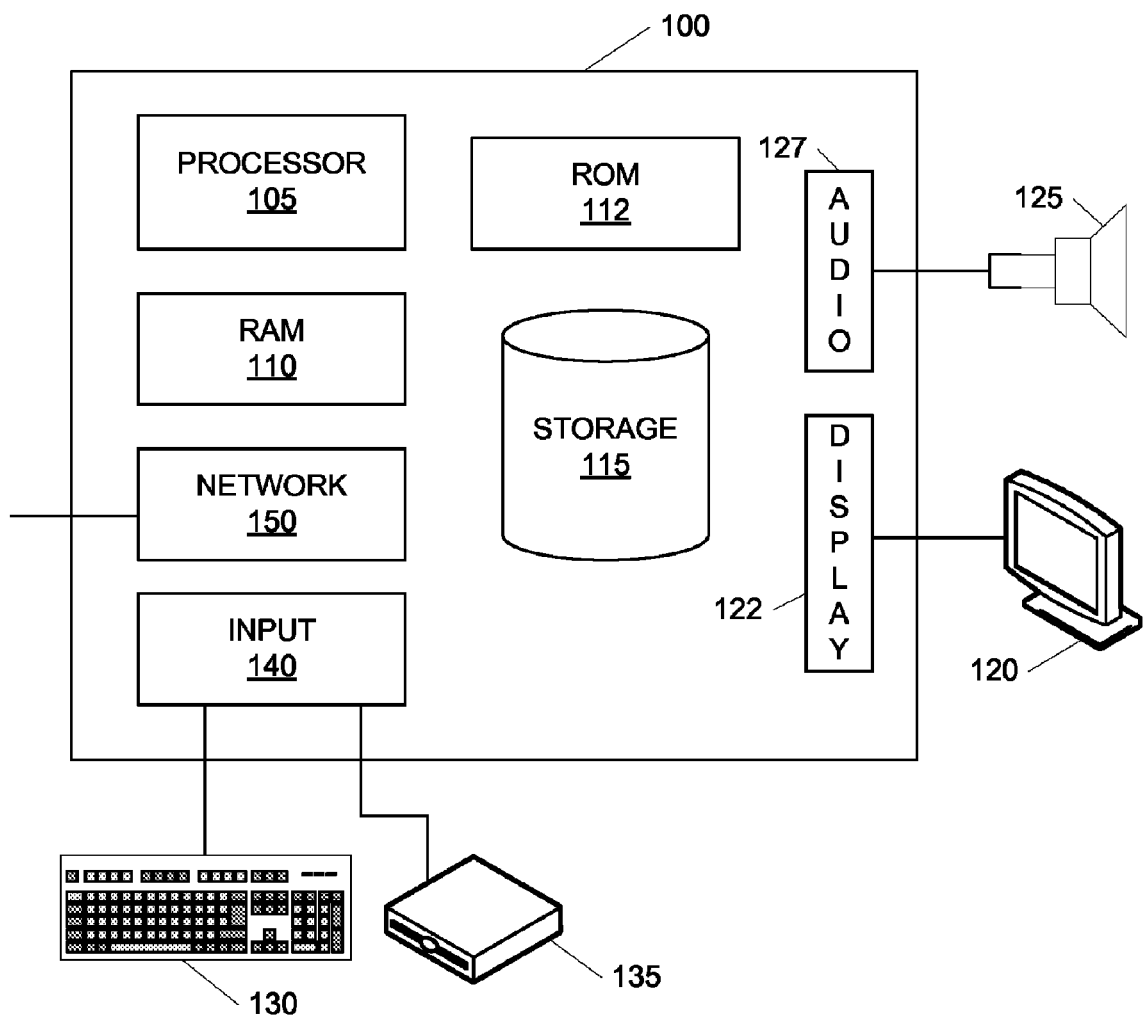
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In another example, credit card input may be received through a card reader (not shown) and converted into a digital format. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
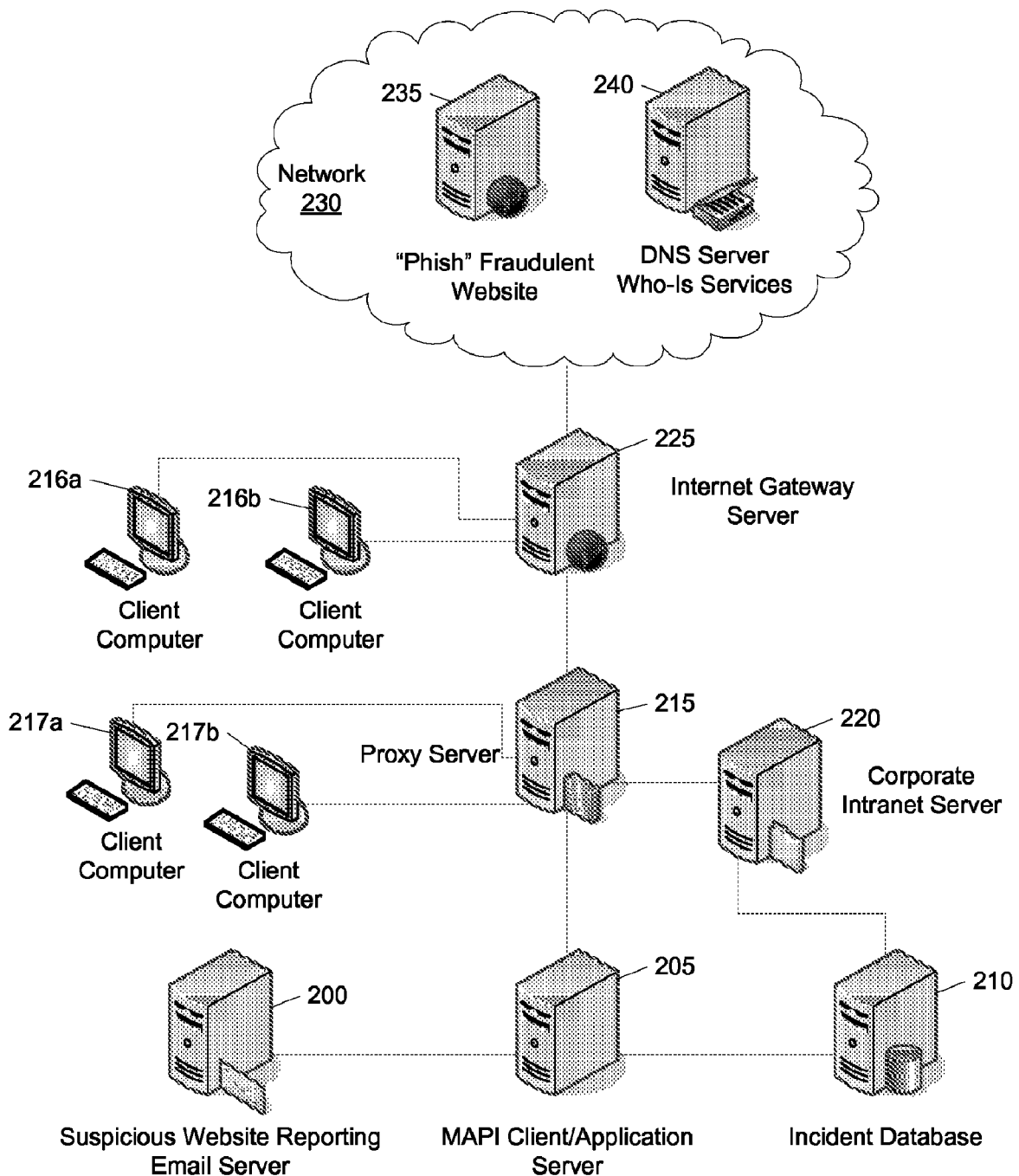
FIG. 2 illustrates a system environment in which one or more aspects described herein may be implemented.

FIG. 2 illustrates a system environment in which one or more aspects described herein may be implemented. The system environment may comprise various servers, including email server 200, application server 205, database server 210, corporate server 220, proxy server 215, and gateway server 225. These servers 200, 205, 210, 220 and 215 may be connected to each other and to other servers via various types of wired and/or wireless networks, such as Local Area Networking (LAN), Wide Area Networking (WAN), IEEE 802.11b/g/a/n, etc. In addition, these servers may be implemented as virtual servers, such that a single physical computer server may be configured to perform the tasks of the multiple virtual servers. Email server 200 may be configured to process and exchange email messages between one or more recipients and senders. In one or more arrangements, email server 200 may be further configured to receive email messages that report and/or identify a suspicious website.

Application server 205 may be configured to store instructions on and/or execute instructions from a computer-readable medium that incorporates one or more aspects described herein. For example, application server 205 may be configured to store instructions on and/or execute instructions from a computer-readable medium that perform the steps of one or more of the methods described below. Application server 205 may further be configured to monitor processes involving web traffic over a proxy server (e.g., server 215). For example, application server 205 may be responsible for performing DNS and WHOIS lookups for cease and desist notice generation and may be further configured to fetch/obtain content for any URI. Additionally or alternatively, application server 205 may scan potential phish sites and compare the content of the sites with predefined criteria or known baselines. In one or more configurations, a messaging application programming interface (MAPI) may be used to manage (e.g., monitor) messages reporting potential phishing sites, to archive such messages and to construct cease and desist messages.

Database server 210 may be configured to store various types and amounts of data. In one or more arrangements, database server 210 may be configured to store Uniform Resource Identifiers (URIs), IP addresses, and/or unique identifiers corresponding to one or more websites. In addition, database server 210 may be further configured to store information for identifying a service provider, such as an Internet Service Provider (ISP), that corresponds to particular IP addresses. Corporate server 220 may be configured to host a corporate intranet or other private network, which may store and provide access to status reports, metrics, and other information. For example, corporate server 220 may host a corporate intranet which stores and provides access to reports and metrics based upon information such as the volume of electronic messages received, the elapsed time between receipt of a particular electronic message and its corresponding classification and/or investigation, the elapsed time between receipt of a particular electronic message and the sending of a responsive cease and desist letter, the elapsed time between receipt of a particular electronic message and the shutdown of a corresponding suspicious website, the elapsed time between sending a cease and desist letter and the shutdown of a corresponding suspicious website, time to ISP response and other information. Other examples of metrics or reports that may be generated include speed metrics, capacity metrics, quality metrics, risk metrics and cost metrics. Speed metrics may include the speed of site shutdown, speed of sending cease and desist letter, time between transmission of cease and desist letter and site shutdown. Cost metrics may include the monthly cost of an abuse team. Risk metrics may include a number of phish sites identified per time period, count of phish sites up at the end of each time period and/or the number of phish sites identified versus phish sites shut down. Quality metrics may include the number of sites that are incorrectly categorized.

Proxy server 215 may be configured to provide access to an external network for its client computers 217. Since all traffic within a network environment must generally pass through proxy server 215, proxy server 215 may control what sites are accessible to client computer 217. In addition, proxy server 215 may further be configured to operate as a firewall. That is, proxy server 215 might permit certain requests and deny others. Gateway server 225, on the other hand, may be configured to act as a load reduction system that helps to parse out spam or other unwanted data directed to client computers 216. Gateway server 225 may also be configured for domain forwarding and for adding destination IPs and domain names. Further, in one or more arrangements, gateway server 225 may be configured to perform lookup services such as querying DNS, querying whois, collecting site source code (e.g., for use in a site status operation) and anonymizing the collection of such data. Anonymization may be accomplished by placing or positioning gateway server 225 outside of an organization's network such that the gateway server's 225 IP address might not be associated with the organization. Further, by placing gateway server 225 outside of the organization's network environment, sites that might be restricted by proxy server 215 may be accessible to gateway server 225.

The system environment may further comprise a network 230, a fraudulent website 235, and a Domain Name System (DNS) server 240. A fraudulent website 235 may be any website that solicits or attempts to solicit information from a user for illegitimate purposes. A fraudulent website 235 may also be referred to as a phish or phishing site. In one example, a fraudulent website 235 may impersonate a legitimate website in order to solicit or attempt to solicit personal information, such as a user's name, address, social security number, account number, password, and/or Personal Identification Number (PIN). DNS server 240 may be configured to provide various services, including DNS lookup services and WHOIS querying services. These DNS lookup services may allow a user to determine an IP address corresponding to a particular domain name, and these WHOIS querying services may allow a user to determine the owner of a particular IP address.

Figure 3:
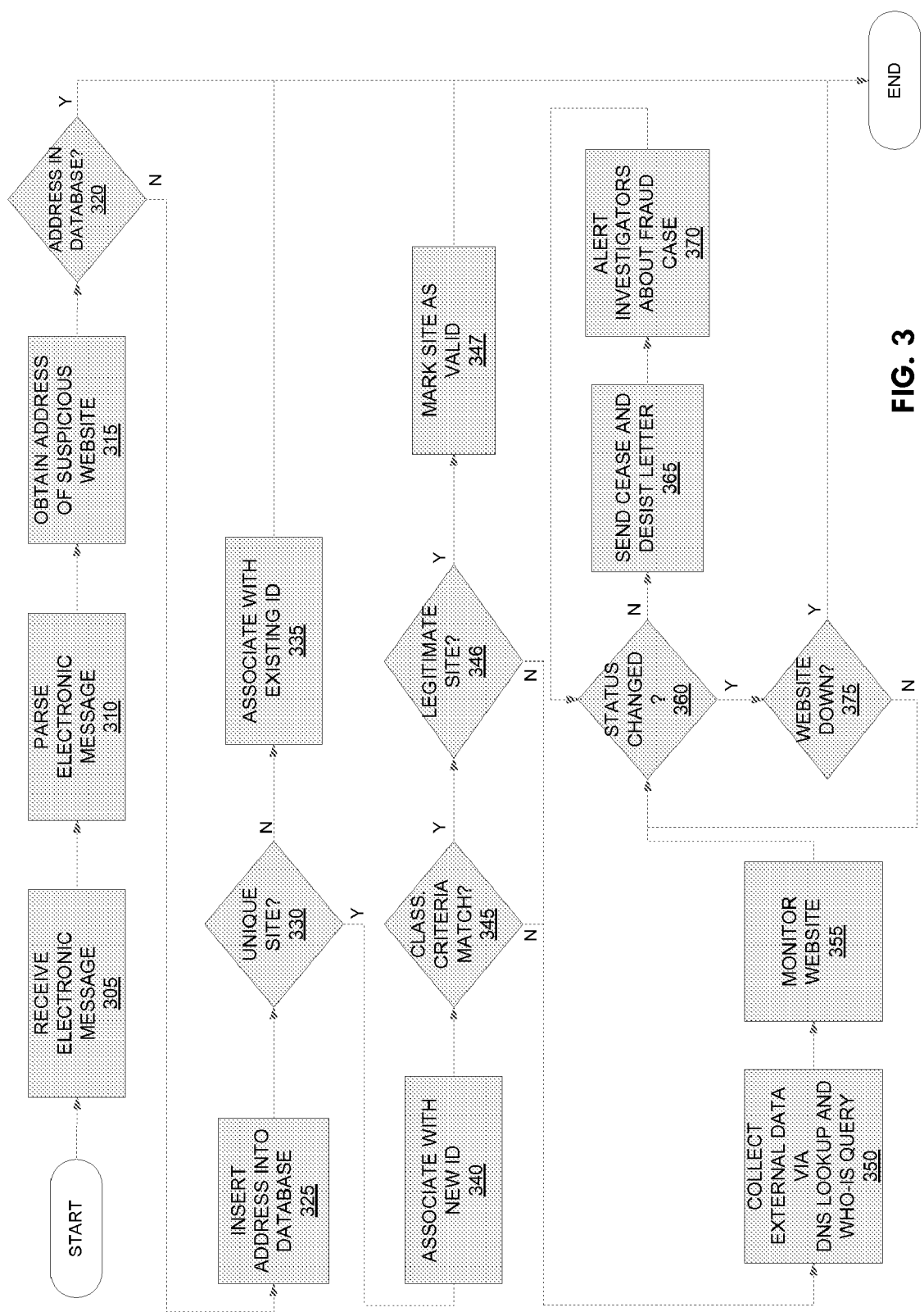
FIG. 3 is a flowchart illustrating a method for identifying and classifying fraudulent sites.

According to one or more aspects, one or more of the systems of FIG. 2 (e.g. email server 200, application server 205, database server 210, proxy server 215, corporate server 220, and/or gateway server 225) may implement a method for identifying, classifying, and terminating fraudulent websites. FIG. 3 is a flowchart illustrating one such method for identifying and classifying suspicious sites (e.g., websites). In step 305, an electronic message may be received. This message may include, for example, an e-mail sent by a user indicating an address of a suspicious site. The user may have received the e-mail message from an operator of a suspicious site and have subsequently forwarded the potentially malicious and fraudulent e-mail message to a legitimate organization to report the fraudulent site. In one configuration, an electronic message may contain one or more Uniform Resource Identifiers (URIs) and/or IP addresses that are associated with one or more suspicious sites. Additionally, responsive to receiving a first electronic message that may indicate an address of a suspicious site, a second electronic message in reply may be sent to the sender of the first electronic message. For example, in response to receiving an electronic message reporting a suspicious site from a user, the system may automatically send an electronic message to the user acknowledging receipt of the user's electronic message. In one or more arrangements, a user's password may automatically be reset when a user reports a suspicious site or when a user reports submitting his or her personal information to a suspicious site. In such configurations, the electronic message that is automatically sent by the system may provide the user with a new password and/or instructions explaining how to obtain a new password and/or reset his or her previous password. Alternatively or additionally, an automatic response may be generated for emails reporting possible phish sites, advising the reporting user not to follow any links in the email. Various other responses may also be generated and sent.

In step 310, the electronic message may be parsed to extract various pieces of information included therein. For example, a regular expression or other algorithm may be applied to the electronic message in order to determine what, if any, URIs and/or IP addresses are contained in the electronic message. Additionally, other message-related information may be extracted through application of a regular expression or other algorithm, such as the sender's email address, the date the message was sent, the date the message was received, the server from which the message originated, and the like. In one or more configurations, a regular expression may be a string that is used to locate text in other strings. For example, the regular expression "^http" or "*http*" may be applied to the source code of the message in order to locate all instances in the message where a Hyper-Text Transfer Protocol (HTTP) URI is mentioned, wherein '*' or '^' character may represent wildcards in a search. In step 315, an address of a suspicious site may be obtained from the parsing and extraction performed in step 310. For example, application of a regular expression to the electronic message may return the result of a particular URI, and this particular URI may correspond to a suspicious site.

In step 320, it may be determined whether the obtained/extracted address is already in a database configured to store addresses and other information related to suspicious sites. For example, a search operation may be performed on the database; in this search operation, the address may be compared to other addresses, the other addresses having been previously inserted into the database. If it is determined that the address is already in the database, a count value that represents the number of times a particular address has been reported may be incremented and the method may end because further processing might not be required. If, on the other hand, it is determined that the address is not already in the database, then in step 325, the address may be inserted into the database.

In step 330, it may be determined whether the suspicious site, corresponding to the address, is unique. Various search strategies and methodologies may be used including string matching, image analysis and/or natural language analysis. The comparison of the suspicious site to information previously stored in a database may be used to assess whether the suspicious site is substantially similar to a suspicious site to which the organization was previously alerted. In addition, even though it may have been determined that the exact address of the suspicious site is not already in the database, the suspicious site's address may still originate from the same domain name. If it is determined that the suspicious site is not unique, then in step 335, the electronic message may be associated with an existing unique identifier and the method may end. In one or more arrangements, this existing unique identifier may correspond to the identifier associated with the known or previously investigated site. If, on the other hand, it is determined that the suspicious site is unique, then in step 340, the electronic message or site address may be associated with a new identifier.

If the site is determined to be unique, then in step 345, the system may determine whether one or more characteristics of the suspicious site matches one or more classification criteria. Classification criteria may include known fraudulent domains, network IDs, host IDs, known fraudulent organizations and the like. In one example, classification criteria may include various portions and characteristics of site addresses (e.g., misspellings). In one example, a system may evaluate similarities between a URI and/or IP address corresponding to the particular suspicious site and URIs and/or IP addresses corresponding to known fraudulent sites. As an example, the system may apply a regular expression to the suspicious URL "http://securityalert/www.financial institution.com/repution/ Online_FI_Banking/UpdatingScreen.dostate=XX/ updating.cfmpage=corp_ficom/ FinancialInstitutionScreen.dostate=XX/security- banking=online/update-information=ficom" to search for phrases (i.e., classification criteria) that are known to appear in addresses corresponding to known fraudulent sites, such as common misspellings of "Finacnial Institution." In one or more configurations, a Bayesian filter or other text classification algorithm may be used to determine the likelihood a site or message is phishing-related. Historical classification of sites and messages may serve to create a dictionary or database of phishing related words and non-phishing related words.

If one or more characteristics of the suspicious site matches the one or more classification criteria, the system may then determine if the classification criteria are indicative of a legitimate site in step 346. For example, some classification criteria may be derived from previously processed suspicious sites. Thus, if a determination was made that the previously processed suspicious sites are legitimate, then the derived classification criteria may also be considered to be indicators of legitimacy. Thus, if one or more characteristics of a suspicious site matches one or more classification criteria indicative of legitimacy, the site being processed and evaluated may also be classified as legitimate. Accordingly, if the site is determined to be legitimate based on the various classification criteria, the site may be marked as valid in step 347 and the process may end as no further action may be needed for legitimate sites. Other or additional classification criteria may include characteristics of different forms of phishing such as spearphish, whaling, Man in the Middle (MITM), Browser in the Middle (BITM), Rock Phish or other newly developed phish techniques. In one or more arrangements, a user may manually navigate to the suspicious site to ascertain various characteristics of the site.

If, however, the characteristics of the suspicious site do not match the one or more classification criteria or if the matched criteria are not indicative of legitimacy, external data may be collected by performing a DNS lookup operation and/or a WHOIS query in step 350. The lack of a match may be indicative of a fraudulent site, or of worth for further investigation. External data may be collected by submitting a request to DNS server 240 via gateway server 225 in order to lookup the IP address of the suspicious site. In making such a request, a URI corresponding to the particular address and/or other information may be submitted, for example, to DNS server 240. In addition, other external data may also be collected by performing a WHOIS query, for instance, which may allow a system or user to determine the owner of a particular IP address.

In step 355, the suspicious site may be monitored. A suspicious site may be monitored manually by an analyst; however, in one or more arrangements, a suspicious site may be monitored automatically by an algorithm. For example, statistical analysis, regular expressions, and/or other rule-based analysis may be applied to the source code and/or linked content of the suspicious site in order to monitor the suspicious site. In other words, in one or more configurations, user input might not be required in order to monitor a suspicious site.

In step 360, it may be determined whether the status of the suspicious site has changed. For example, based on antecedent monitoring of the suspicious site, it may be determined that the status of the suspicious site has changed from fraudulent to legitimate, or vice-versa; or, it may be determined that the status of the suspicious site has changed from online to offline, or vice-versa. According to one aspect, certain rules may be used to determine if a site is no longer likely a phish site. For example, if a site has no forms, scripting and/or refresh tags, the likelihood that the site is a phish site may be smaller. If it is determined that the status of the suspicious site has not changed, then in step 365, a cease-and-desist letter or other notice may be sent or given to the owner of the particular IP address corresponding to the suspicious site. Subsequently, in step 370, internal and/or external investigators may be automatically alerted or otherwise informed about the suspicious site. In addition, the suspicious site may be subject to continuous monitoring, and step 360 may be repeated one or more times so as to determine whether the status of the suspicious site has changed. Also, additional cease-and-desist letters or other forms of notice may be automatically sent or given to the owner of the particular IP address corresponding to the suspicious site. Stated differently, in one or more configurations, user input might not be required in order to send cease-and-desist letters or give other forms of notice to the owner of the particular IP address corresponding to the suspicious site.

If, on the other hand, it is determined that the status of the suspicious site has changed, then in step 375, it may be determined whether the suspicious site is offline, legitimate, and/or no longer suspicious for other reasons. If it is determined that the suspicious site is offline, legitimate, and/or no longer suspicious for other reasons, then the method may end. If, on the other hand, it is determined that the suspicious site is not offline, legitimate, and/or no longer suspicious for other reasons, then step 360 may be repeated one or more times so as to determine whether the status of the suspicious site has changed. In one or more arrangements, the system may determine if a change has taken place over a predefined amount of time (e.g., 24 hours), before determining if action is needed.

According to one or more aspects, step 365 may be omitted. For example, in some cases, it may be advantageous to automatically alert or otherwise inform internal or external investigators without sending a cease-and-desist letter or otherwise giving notice to the owner or operator of the suspicious site. For instance, if the suspicious site were hosted on a server owned or operated by an illegitimate individual or organization, or if a person directly responsible for the suspicious site would be the recipient of a cease-and-desist letter, the internal and/or external investigators may be better able to investigate the suspicious site and the person(s) and/or organization(s) responsible for it, if such investigation went undetected by the person(s) and/or organization(s) responsible for the suspicious site. In these circumstances or others, it may be advantageous to omit step 365.

In one or more configurations, an expiration date may be attached to a classification of a particular site, such that on or after the expiration date, the classification of the particular site may expire and the particular site may be classified again. For example, a site classified on January 1 may have an expiration date of March 1 attached to its classification, such that on March 1, the site is again classified as legitimate or fraudulent or ignore. Thus, attaching an expiration date to the classification of a particular suspicious site may address situations where a phishing site is first shut down and subsequently comes back online.

Figure 4:
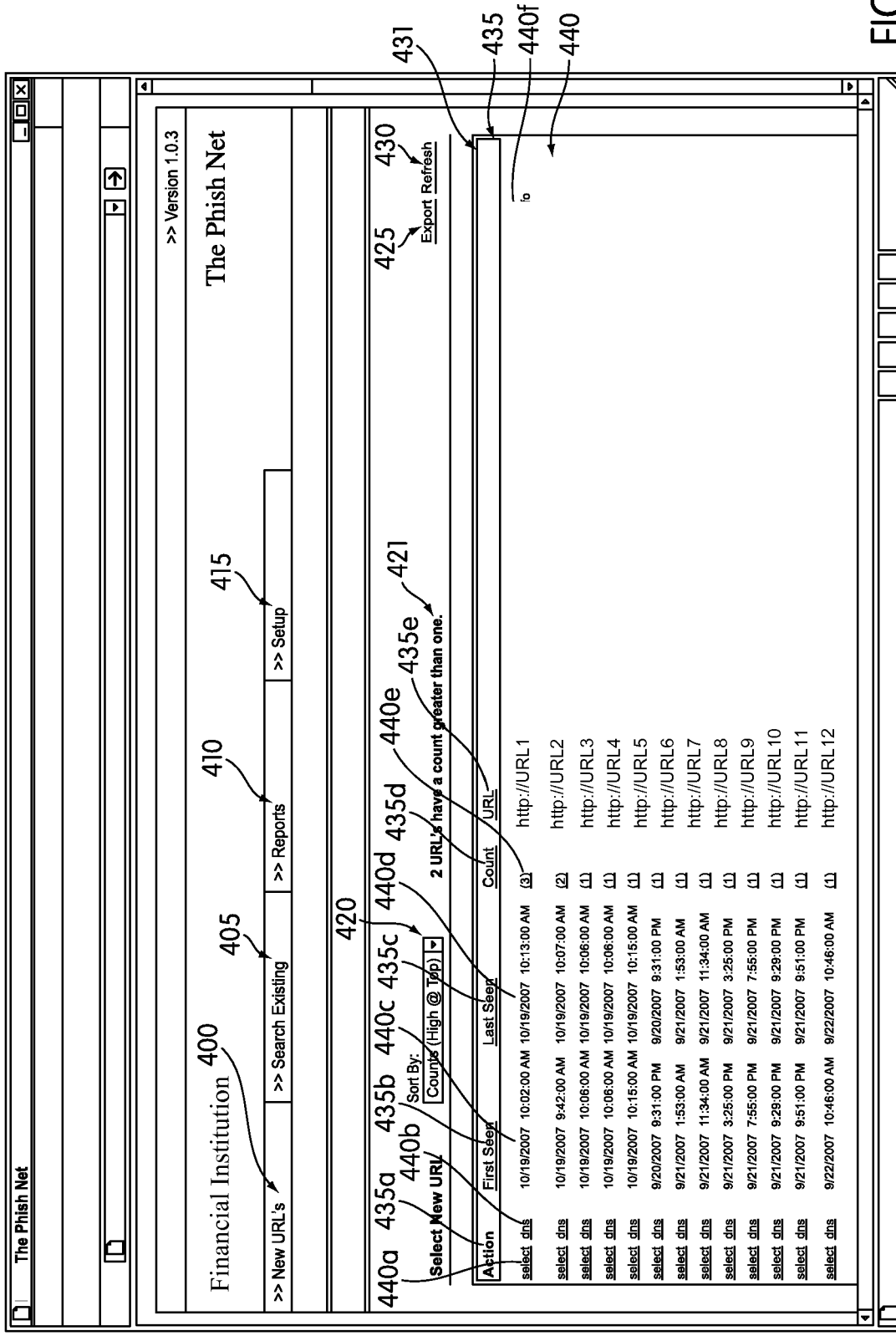
FIG. 4 illustrates a user interface displaying a listing of fraudulent websites and functions according to one or more aspects described herein.

FIG. 4 illustrates a user interface displaying a listing of suspicious websites and functions according to one or more aspects described herein. In one or more configurations, the user interface may be implemented in the form of a dynamic webpage, utilizing various programming languages and computing protocols such as Hypertext Markup Language (HTML), Dynamic HTML (DHTML), JAVA, JAVASCRIPT, ADOBE FLASH, MICROSOFT Active Server Pages, and/or MICROSOFT .NET. In addition, the user interface may include one or more hyperlinks which may effect the execution of a particular function or module upon activation by a user. For example, the user may activate a hyperlink linked to a JAVASCRIPT function, thereby causing execution of the function. The user interface may also include several tabs at the top of the page, such as New URLs tab 400, Search Existing tab 405, Reports tab 410, and Setup tab 415. For example, New URLs tab 400 may allow a user to view a different webpage or a different section of a webpage that may contain a listing of suspicious websites that have recently been reported and/or that have yet to be investigated and/or classified. Search Existing tab 405 may, for example, allow a user to view a different webpage that may contain a search box allowing a user to search the database based on parameters such as URL, first-seen date, last-seen date, and/or count. As another example, Reports tab 410 may allow a user to view a webpage or section of a page that may contain reports on metrics. These metrics may be based upon, for instance, information such as the volume of electronic messages received, the elapsed time between receipt of a particular electronic message and its corresponding classification and/or investigation, the elapsed time between receipt of a particular electronic message and the sending of a responsive cease and desist letter, the elapsed time between receipt of a particular electronic message and the shutdown of a corresponding suspicious website, the elapsed time between sending a cease and desist letter and the shutdown of a corresponding suspicious website, and other information. In addition, Setup tab 415 may, for example, allow a user to view a different webpage that may permit configuration changes to be made to user preferences, as well as configuration changes to underlying programs, functions, and/or modules.

According to one or more aspects, the user interface may also include Sort-By control 420. In the illustrated arrangement, the Sort-By control 420 may be a pull-down menu, and may allow a user to select and/or change the manner in which the listing of suspicious websites 431 is displayed. For example, a user may interact with the Sort-By control 420 and select a different sort option to apply to the listing of suspicious websites 431. A user may, for instance, select to sort the listing of suspicious websites 431 by old-to-new, new-to-old, descending count value, ascending count value, alphabetical, reverse-alphabetical, descending first-seen date, or descending last-seen date. Depending on the sort method, as selected by a user through the Sort-By control 420, the user interface may include a status message 421. For example, as seen in FIG. 4, if a user selects a descending count value option, the status message 421 may contain relevant text indicating the number of URLs with a high count value. The user interface may also include export link 425 and refresh link 430. Export link 425 may, for example, allow a user to export data relating to the listing of suspicious websites 431, as further discussed below with respect to FIG. 5. In addition, Refresh link 430 may, for example, allow a user to refresh the listing of suspicious websites 431.

Additionally, the listing of suspicious websites 431 may comprise a header bar 435 and one or more list elements 440. The header bar may include one or more column headings, and these column headings may be hyperlinks. For example, the header bar may contain Action heading 435a, First Seen heading 435b, Last Seen heading 435c, Count heading 435d, and URL heading 435e. In addition, activating a hyperlink corresponding to a column heading may, for example, select and/or change the manner in which the listing of suspicious websites 431 is displayed. A list element 440 may include various sub-elements, and these sub-elements may be hyperlinks. For example, a list element 440 may include a select link 440a, a DNS link 440b, a first-seen date 440c, a last-seen 440d, a count value 440e, and a URL 440f. The select link 440a may allow a user to access more information about the suspicious website corresponding to the particular list element 440. For example, a user may activate select link 440a, and then view a user interface displaying a form that allows the user to classify the suspicious website, as further discussed below with respect to FIG. 8. The DNS link 440b may allow a user to perform a DNS lookup operation and/or WHOIS query on the URI or IP address corresponding to the particular list element 440. In one example, a domain "bbc.co.uk" may be extracted from an URI such as http://news.bbc.co.uk/. The WHOIS query may thus, in one or more configurations, be run on the domain. The first-seen date 440c may indicate the date at which the suspicious website corresponding to the particular list element 440 was first reported, classified, and/or monitored. Similarly, the last-seen date 440d may indicate the date at which the suspicious website corresponding to the particular list element 440 was last reported, classified, and/or monitored. The count value 440e may indicate the number of times the suspicious website corresponding to the particular list element 440 has been reported and/or the number of electronic mail messages received. The URL 440f may indicate a URI or IP address related to the suspicious website corresponding to the particular list element 440.

FIG. 5 illustrates a user interface displaying an export listing that allows a user to export a listing of suspicious websites to a data file according to one or more aspects described herein. A user may access the user interface illustrated in FIG. 5 via activating export link 425 of FIG. 4, for example. The user interface of FIG. 5 may include a listing of suspicious websites 500, as well as a header bar 505 and one or more list elements 510. The header bar 505 may include one or more column headings, and these column headings may be hyperlinks. For example, header bar may contain ID heading 505a, First Available heading 505b, Last Available heading 505c, and Count heading 505d. In addition, activating a hyperlink corresponding to a column heading may, for example, select and/or change the manner in which the listing of suspicious websites 500 is displayed. A list element 510 may include various sub-elements, and these sub-elements may be hyperlinks. For example, a list element 510 may include an ID value 510*a*, a first-available date 510*b*, a last-available date 510*c*, a count value 510*d*, and a URI or IP address 510*e*.

According to one or more aspects, the user interface may also include a toolbar 501 that includes various buttons, links, and/or other elements to allow a user to export the listing of suspicious websites 500. The toolbar 501 may include navigation buttons 515, which allow a user to navigate forward, backward, or to a specific page. In addition, the toolbar 501 may include a zoom menu 520 allowing a user to select and/or change the scale at which the listing of suspicious websites 500 is displayed. The toolbar 501 may also include a search box 535, with an associated Find link 540 and a Next link 545. Additionally, the toolbar 501 may include a Select-Format pull-down menu 550 and an Export button 555. The toolbar 501 may also include a refresh button 560 and a print button 565. The toolbar 501 may allow a user to export the listing of suspicious websites 500. For example, a user may choose a particular file format, such as Comma Separated Value (.CSV) or Microsoft Excel Spreadsheet (.XLS) from Select-Format pull-down menu 550, and then activate Export button 555, thus effecting the creation of an external file, in the chosen file format, that may contain all or some of the data in the listing of suspicious websites 500. In one or more configurations, it may be advantageous to export the listing of suspicious websites 500 so as to, for example, view the listing of suspicious websites on a remote computer (i.e. a computer not behind the proxy server 215) or detect errors in the database and/or servers. In addition, it may be advantageous to export the listing of suspicious websites 500 so as to, for instance, facilitate classification of a suspicious website as legitimate or fraudulent.

Figure 6:
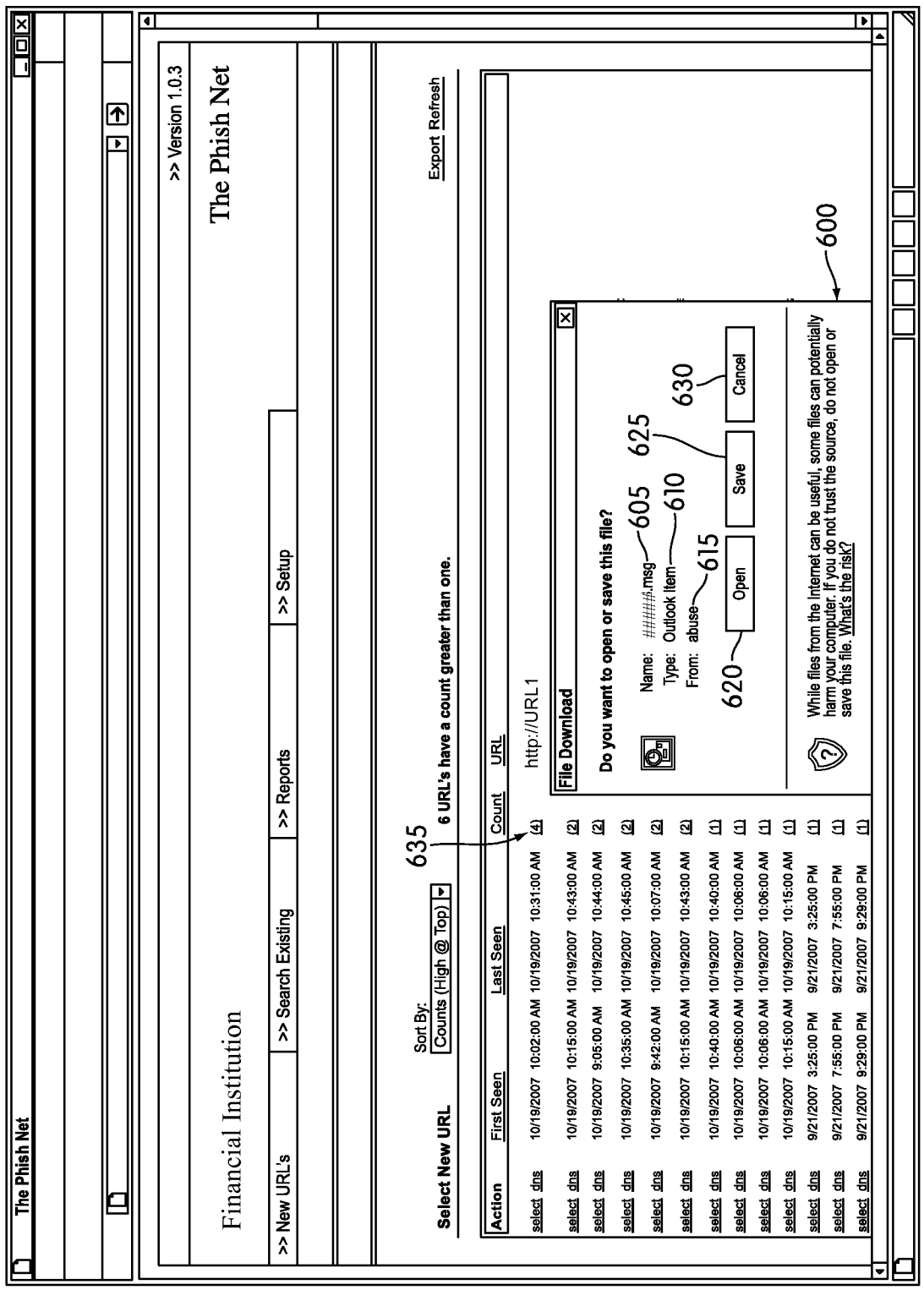
FIG. 6 illustrates a user interface displaying a download window according to one or more aspects described herein.

FIG. 6 illustrates a user interface displaying a download window according to one or more aspects described herein. A user may access the user interface illustrated in FIG. 6 via activating count link 635, for example. The user interface may include a download window 600, a file name indicator 605, a file type indicator 610, and a mailbox indicator 615. In addition, the user interface may include an open button 620, a save button 625, and a cancel button 630. Also, the user interface may include one or more count links, such as count link 635. Download window 600 may allow a user to open or save an electronic message that reports a suspicious website. For example, a user may activate count link 635 in order to open or save one or more electronic messages associated with the suspicious website to which count link 635 corresponds. According to one or more aspects, a user may want to open or save such an electronic message because the electronic message may include, for example, a forwarded message that comprises a "phishing lure" (i.e. a fraudulent electronic message that purports to be sent from a legitimate institution in order to lure its recipient(s) to a fraudulent website). For instance, a user may be better able to classify a suspicious website if the user has access to the electronic message(s) that reported the suspicious website.

Figure 7:
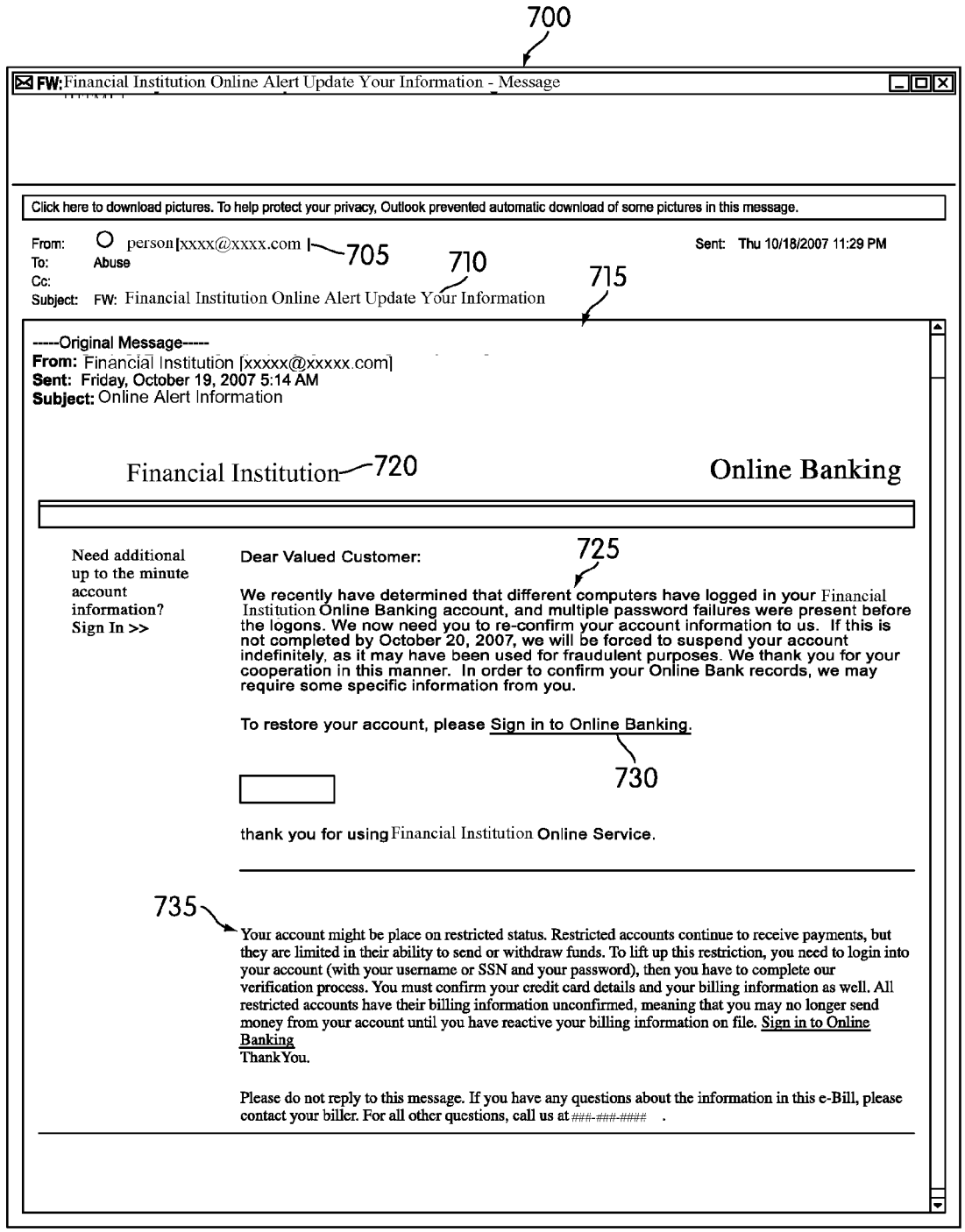
FIG. 7 illustrates a user interface displaying an electronic message that indicates the address of a suspicious website according to one or more aspects described herein.

FIG. 7 illustrates a user interface displaying an electronic message that indicates the address of a suspicious website according to one or more aspects described herein. The user interface may contain a window 700 that contains an electronic message 715 which indicates the address of a suspicious website. In one or more configurations, electronic message 715 may be sent by a user in order to report a suspicious phishing site, and may include an attached and/or forwarded message which the user might have received from an operator of the suspicious phishing site. The window 700 may also contain a mailbox indicator 705, a subject indicator 710, and other information. In addition, the electronic message 715 may be a phishing lure. For example, electronic message 715 may contain one or more logos and paragraphs (e.g. logo 720, paragraph 725, and paragraph 735) that may suggest that the electronic message 715 is legitimate, as well as a hyperlink 730 that may link to a fraudulent website. Based on electronic message 715 and its contents, as well as hyperlink 730 and its corresponding linked website, a user may, for example, be able to classify the corresponding linked website as legitimate or fraudulent.

Figure 8:
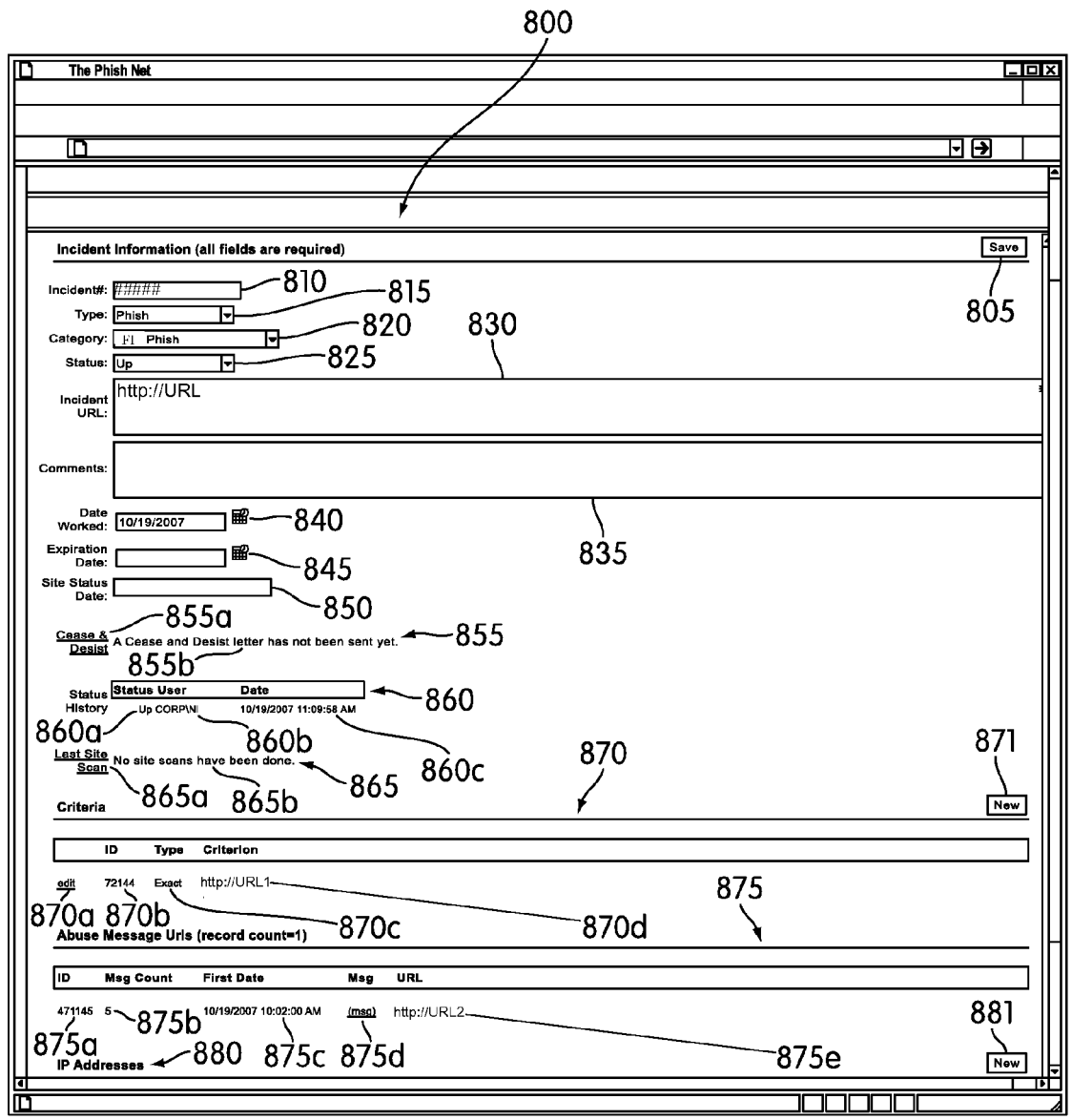
FIG. 8 illustrates a user interface displaying a form that allows a user to classify a suspicious website according to one or more aspects described herein.

FIG. 8 illustrates a user interface displaying a form that allows a user to classify a suspicious website according to one or more aspects described herein. Similar to the other user interfaces described herein, the user interface may, in one or more configurations, be implemented in the form of a dynamic webpage, and may include one or more hyperlinks. The user interface may include a form 800 that allows a user to view data in, enter data into, and/or modify data in various fields. Form 800 may include an incident number field 810. In one or more configurations, a user might not be able to enter data into and/or modify data in incident number field 810. For example, incident numbers may be generated automatically and/or sequentially as more incidents are created, such that the generated incident number is automatically populated in incident number field 810. Form 800 may also include a type field 815. Type field 815 may, for example, allow a user to edit and/or view the classification of the selected suspicious website as legitimate or fraudulent, or as "Valid," "Ignore," or "Phish." In addition, form 800 may include a category field 820, which may allow a user to edit and/or view a category corresponding to the selected suspicious website. For example, a user evaluating the electronic message displayed in FIG. 7 may specify that the corresponding suspicious website falls in the "FI Phish" category, because that particular electronic message solicits or attempts to solicit information from the Financial Institution (FI) customers. Other types of categories may also be defined. Form 800 may also include a status field 825, which may allow a user to edit and/or view the status of the selected suspicious website. For example, the form may display whether the selected suspicious website is online ("up") or offline ("down").

In addition, in one or more configurations, form 800 may include an incident URL field 830. Incident URL field 830 may, for example, allow a user to edit and/or view an IP address and/or URI corresponding to the selected suspicious website. Form 800 may also include a comments field 835, which may allow a user to edit and/or view comments relating to the selected suspicious website. In addition, form 800 may include a date worked field 840, an expiration date field 845, and a site status date field 850. These date fields may, for example, allow a user to edit and/or view the date at which the selected website was classified, the date at which the classification of the selected website will expire, and the date at which the status of the selected website was last updated, respectively. Form 800 may also include save button 805, which may allow a user to save changes made to the various fields of form 800.

According to one or more aspects, form 800 may include cease and desist menu 855. Cease and desist menu 855 may be comprised of hyperlink 855*a* and status message 855*b*. Cease and desist menu 855 may allow a user to create and/or send a cease and desist letter with respect to the selected suspicious website, and also may allow a user to determine whether a cease and desist letter has already been sent with respect to the selected suspicious website. For example, a user may activate hyperlink 855*a* and then view a user interface displaying a form that allows the user to determine parties responsible for the suspicious website, as well as create and/ or send a cease and desist letter, as further discussed below with respect to FIG. 9-11. In addition, a user may view status message 855b, and accordingly determine, for example, whether a cease and desist letter has already been sent with respect to the selected suspicious website. Form 800 may also include status history menu 860, which may allow a user to view status history relating to the selected suspicious website. Status history menu 860 may be comprised of one or more list elements, which may each include, for example, status 860a, username 860b, and date 860c. In addition, form 800 may include site scan menu 865. Site scan menu 865 may be comprised of hyperlink 865a and status message 865b. Site scan menu 865 may allow a user to manually trigger a scan of the selected suspicious website; this scan may provide a basis, in whole or in part, for classification of the website. For example, a user may activate hyperlink 865a, thus triggering an automatic scan of the source code and/or linked content of the selected suspicious website to which statistical analysis, regular expressions, and/or other rule-based analysis or algorithms may be applied. In addition, a user may view status message 865b, and accordingly determine, for example, whether a site scan has already been performed.

According to one or more aspects, form 800 may include criteria matching menu 870. Criteria matching menu 870 may be comprised of one or more list elements, which may each include, for example, an edit link 870a, an ID number 870b, a matching type 870c, and a criterion 870d. Criteria matching menu 870 may allow a user to associate one or more IP addresses or URIs with the selected suspicious website. For example, it may be the case that two or more URIs and/or IP addresses, different from each other, correspond to the same suspicious website. In such a situation, criteria matching menu 870 may allow a user to apply, for example, exact, wild, or regular expressions to the various URIs and/or IP addresses, so as to assess similarities and determine whether the various URIs and/or IP addresses correspond to the same suspicious website.

In one or more configurations, to use criteria matching menu 870, a user may, for example, activate edit link 870a, which may result in the display of a window that allows the user to choose a matching type (e.g. exact, wild, or regular expression) and allows the user to edit the criterion (i.e. it allows the user to edit the IP address and/or URI). In addition, form 800 may include abuse message URLs menu 875. Abuse message URLs menu 875 may be comprised of one or more list elements, which may each include, for example, an ID number 875a, a message count 875b, a first-seen date 875c, a message link 875d, and a URL 875e. Abuse message URLs menu 875 may allow a user to access and/or view one or more electronic mail messages which reported the selected suspicious website. For example, as seen in FIG. 8, the user interface may display a URL 875e that has been parsed and obtained from a particular electronic message on a past date 875c. Continuing this example, the user interface may display an ID number 875a corresponding to the URL 875e, as well as the message count 875b, which indicates the number of times the phishing lure corresponding to URL 875e has been received via an electronic message. In addition, the user may, for example, activate link 875d in order to access and/or view the electronic message and/or phishing lure. Form 800 may also include new criterion button 871 and new abuse message URL button 881, which may allow a user to add a new criterion or a new abuse message URL, respectively. In addition, form 800 may include an IP Address menu 880, as further discussed below with respect to FIG. 12.

Figure 9:
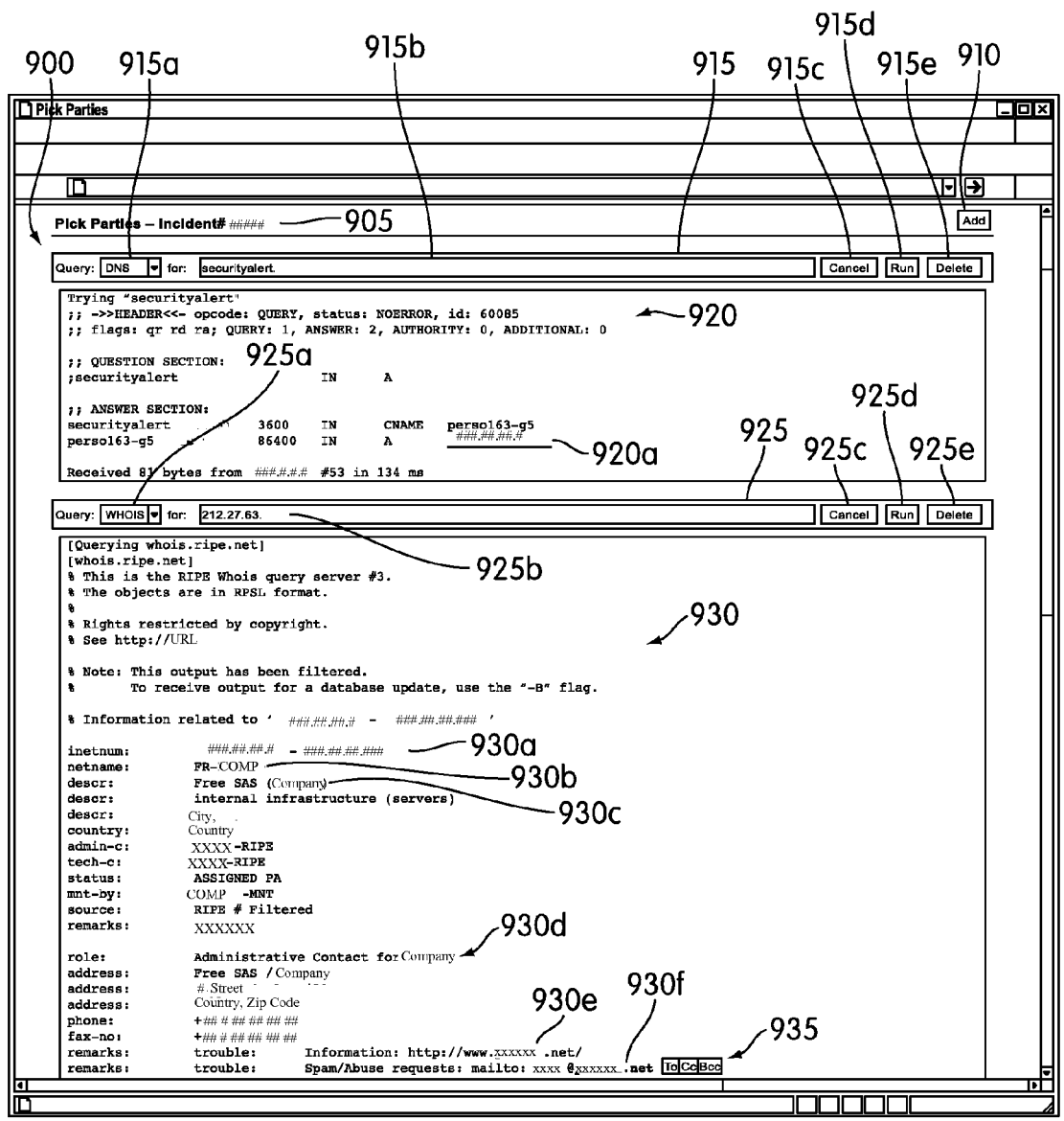
FIG. 9 illustrates a user interface displaying a form that allows a user to determine parties responsible for a suspicious website, as well as create and/or send a cease and desist letter according to one or more aspects described herein.

FIG. 9 illustrates a user interface displaying a form that allows a user to determine parties responsible for a suspicious website, as well as create and/or send a cease and desist letter according to one or more aspects described herein. As similar to the other user interfaces described herein, the user interface may, in one or more configurations, be implemented in the form of a dynamic webpage, and may include one or more hyperlinks. The user interface may include a form 900 that allows a user to view data in, enter data into, and/or modify data in various fields. Form 900 may include an incident number indicator 905, as well as an add query button 910. The add query button 910 may, for example, allow a user to add another DNS query menu or WHOIS query menu, similar to those further discussed below.

According to one or more aspects, form 900 may contain a DNS query menu 915. DNS query menu 915 may contain a query-selection pull-down menu 915a, a URI textbox 915b, a cancel button 915c, a run button 915d, and a delete button 915e. In addition, DNS query menu 915 may have a corresponding results field, such as, for example, DNS query results field 920. DNS query results field 920 may further include one or more resulting IP addresses, such as, for example, resulting IP address 920a. DNS query menu 915 may allow a user to execute and/or view the results of a DNS query. For example, a user may select "DNS" from query-selection pull-down menu 915a, enter the URI corresponding to the selected suspicious website in URI textbox 915b, activate run button 915d, and view results of the DNS query in DNS query results field 920. In one or more configurations, the DNS query may be executed automatically by the system, such that "DNS" is already selected from query-selection pull-down menu 915a, the URI corresponding to the selected suspicious website is already entered into URI textbox 915b, and the user may merely view the results of the query in DNS query results field 920. Stated differently, in one or more configurations, it might not require input from a user in order to execute a DNS query.

According to one or more aspects, form 900 may also contain a WHOIS query menu 925. WHOIS query menu 925 may contain a query-selection pull-down menu 925a, an IP address textbox 925b, a cancel button 925c, a run button 925d, and a delete button 925e. In addition, WHOIS query menu 925 may have a corresponding results field, such as, for example, WHOIS query results field 930. WHOIS query results field 930 may further include an IP address range 930a, a network name 930b, an ISP name 930c, ISP contact information 930d, an ISP URI 930e, and an ISP email address 930f. WHOIS query menu 925 may allow a user to execute and/or view the results of a WHOIS query. For example, a user may select "WHOIS" from query-selection pull-down menu 925a, enter the IP address corresponding to the selected suspicious website in URI textbox 925b, activate run button 925d, and view results of the WHOIS query in WHOIS query results field 930. In one or more configurations, the WHOIS query may be executed automatically by the system, such that "WHOIS" is already selected from query-selection pull-down menu 925a, the IP address corresponding to the selected suspicious website is already entered into IP address textbox 925b, and the user may merely view the results of the query in WHOIS query results field 930. Stated differently, in one or more configurations, it might not require input from a user in order to execute a WHOIS query. In addition, ISP email address 930f may facilitate the sending of a cease and desist letter, as, for example, such a letter may be sent to the ISP email address 930f identified by the WHOIS query. Also, the system may display an email menu 935 adjacent to ISP email address 930f, so as to facilitate communication with the ISP.

Figure 10:
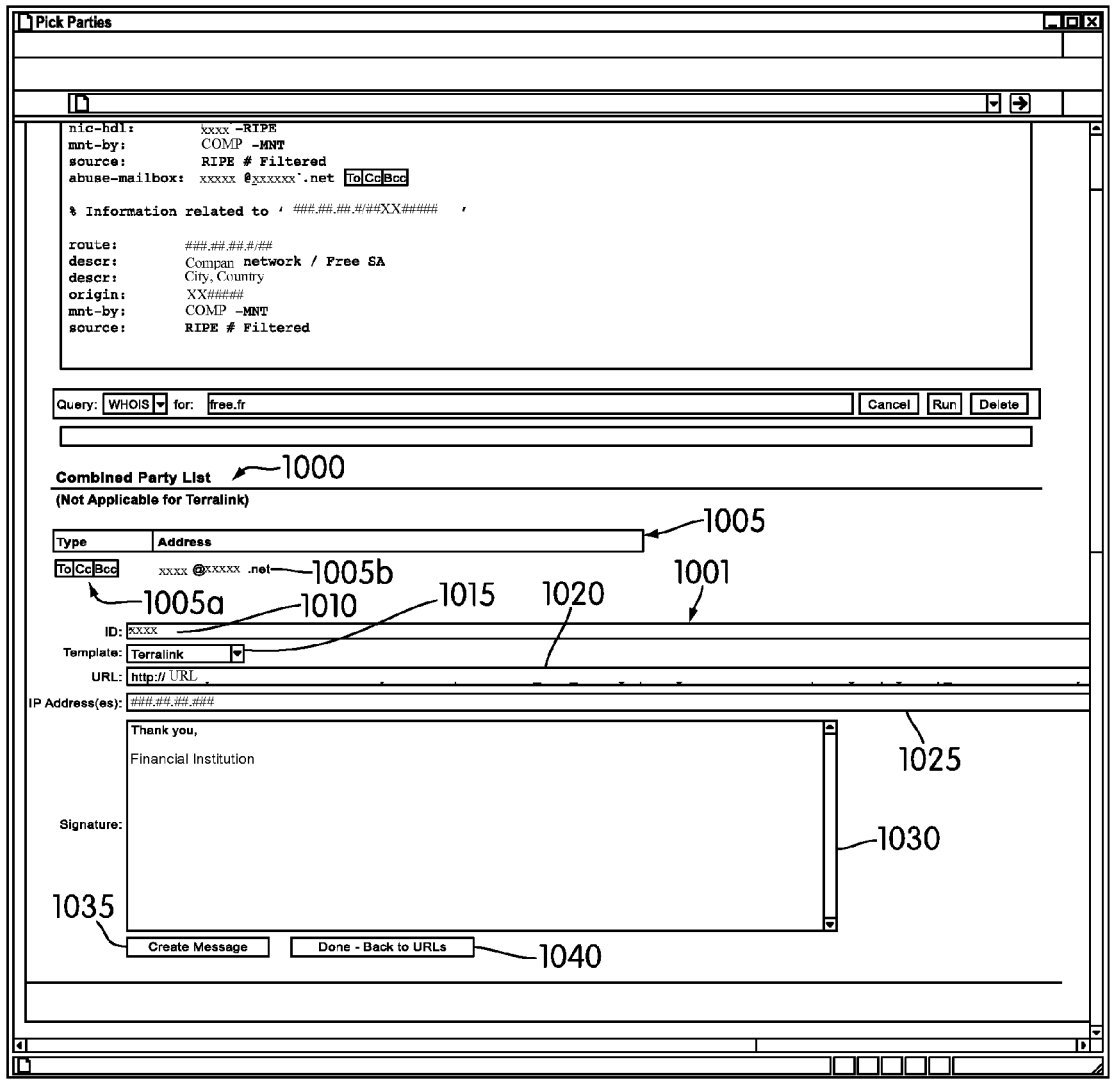
FIG. 10 illustrates a user interface displaying a form that allows a user to create and/or send a cease and desist letter according to one or more aspects described herein.

FIG. 10 illustrates a user interface displaying a form that allows a user to create and/or send a cease and desist letter according to one or more aspects described herein. As similar to the other user interfaces described herein, the user interface may, in one or more configurations, be implemented in the form of a dynamic webpage, and may include one or more hyperlinks. The user interface may include a form 1000 that allows a user to view data in, enter data into, and/or modify data in various fields. Form 1000 may include a list of recipients 1005. List of recipients 1005 may be comprised of one or more list elements, which may each include, for example, a type element 1005a and an email address 1005b.

According to one or more aspects, form 1000 may include a template email menu 1001. Template email menu 1001 may include an ID number indicator 1010, a template-selection pull-down menu 1015, a URL textbox 1020, an IP address textbox 1025, a signature textbox 1030, a create message button 1035, and a done button 1040. Template email menu 1001 may allow a user to create and/or send a cease and desist letter based on a pre-defined template. For example, a user may select a particular template from template-selection pull-down menu 1015, enter the URI corresponding to the selected suspicious website in URL textbox 1020, enter the IP address corresponding to the selected suspicious website in IP address textbox 1025, enter a closing and/or signature into signature textbox 1030, and activate create message button 1035 so as to create and/or send a cease and desist letter. In one or more configurations, a cease and desist letter may be created and/or sent automatically by the system. For example, it might not require input from a user in order to create and/or send a cease and desist letter.

Figure 11:
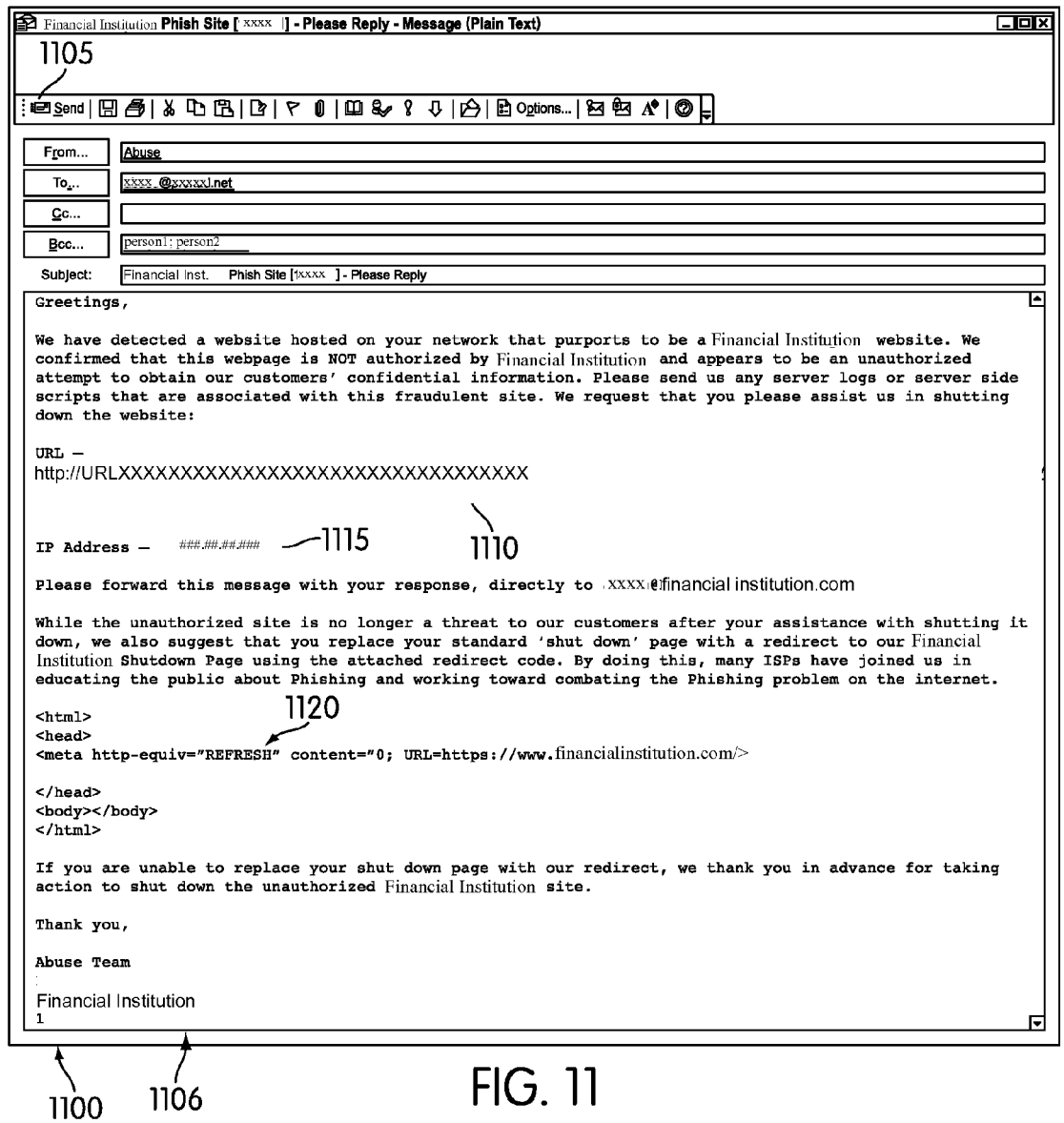
FIG. 11 illustrates a user interface displaying a cease and desist letter based on a pre-defined template according to one or more aspects described herein.

FIG. 11 illustrates a user interface displaying a cease and desist letter based on a pre-defined template according to one or more aspects described herein. The user interface may include a message window 1100, which itself may include a send button 1105. In addition, message window 1100 may comprise a content area 1106 that includes the message content of the cease and desist letter. For example, content area 1106 may include a URI corresponding to the suspicious website 1110, an IP address corresponding to the suspicious website 1115, and an HTML redirect template 1120. In one or more configurations, it may be advantageous to include HTML redirect template 1120 in a cease and desist letter, so as to assist an organization in alerting its users about the suspicious website. A user may send the cease and desist letter, for example, by activating send button 1105.

Figure 12:
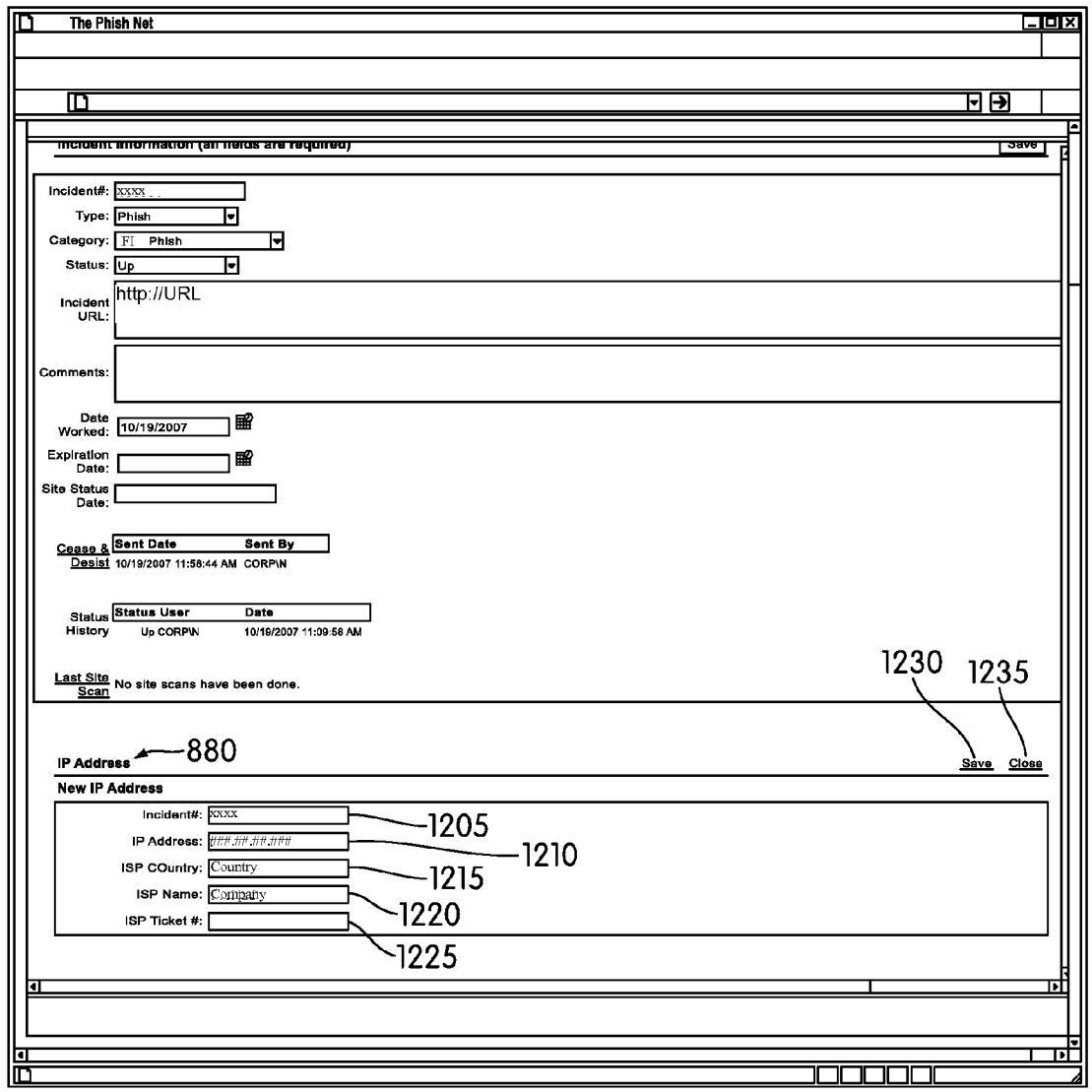
FIG. 12 illustrates a user interface displaying a form that allows a user to log ISP information according to one or more aspects described herein.

FIG. 12 illustrates a user interface displaying a form that allows a user to log ISP information according to one or more aspects described herein. As similar to the other user interfaces described herein, the user interface may, in one or more configurations, be implemented in the form of a dynamic webpage, and may include one or more hyperlinks. IP Address menu 880 may include an incident ID textbox 1205, an IP address textbox 1210, an ISP country textbox 1215, an ISP name textbox 1220, and an ISP ticket number textbox 1225. In addition, the user interface may include save hyperlink 1230 and close hyperlink 1235. IP Address menu 880 may allow a user to log information about an ISP that hosts and/or hosted the selected suspicious website. For example, after a DNS query and/or WHOIS query has been performed, a user may wish to log information that has been obtained about the ISP. Thus, the user may, for instance, enter the IP address of the selected suspicious website into IP address textbox 1210, enter the country in which the ISP is located into ISP country textbox 1215, enter the name of the ISP into ISP name textbox 1220, and enter a ticket number assigned by the ISP to the selected suspicious website into ISP ticket number textbox 1225. In one or more configurations, the system may automatically log information about an ISP that hosts and/or hosted a particular suspicious website. Stated differently, in one or more configurations, it might not require input from a user in order to log information about an ISP that hosts and/or hosted a particular suspicious website.

Figure 13:
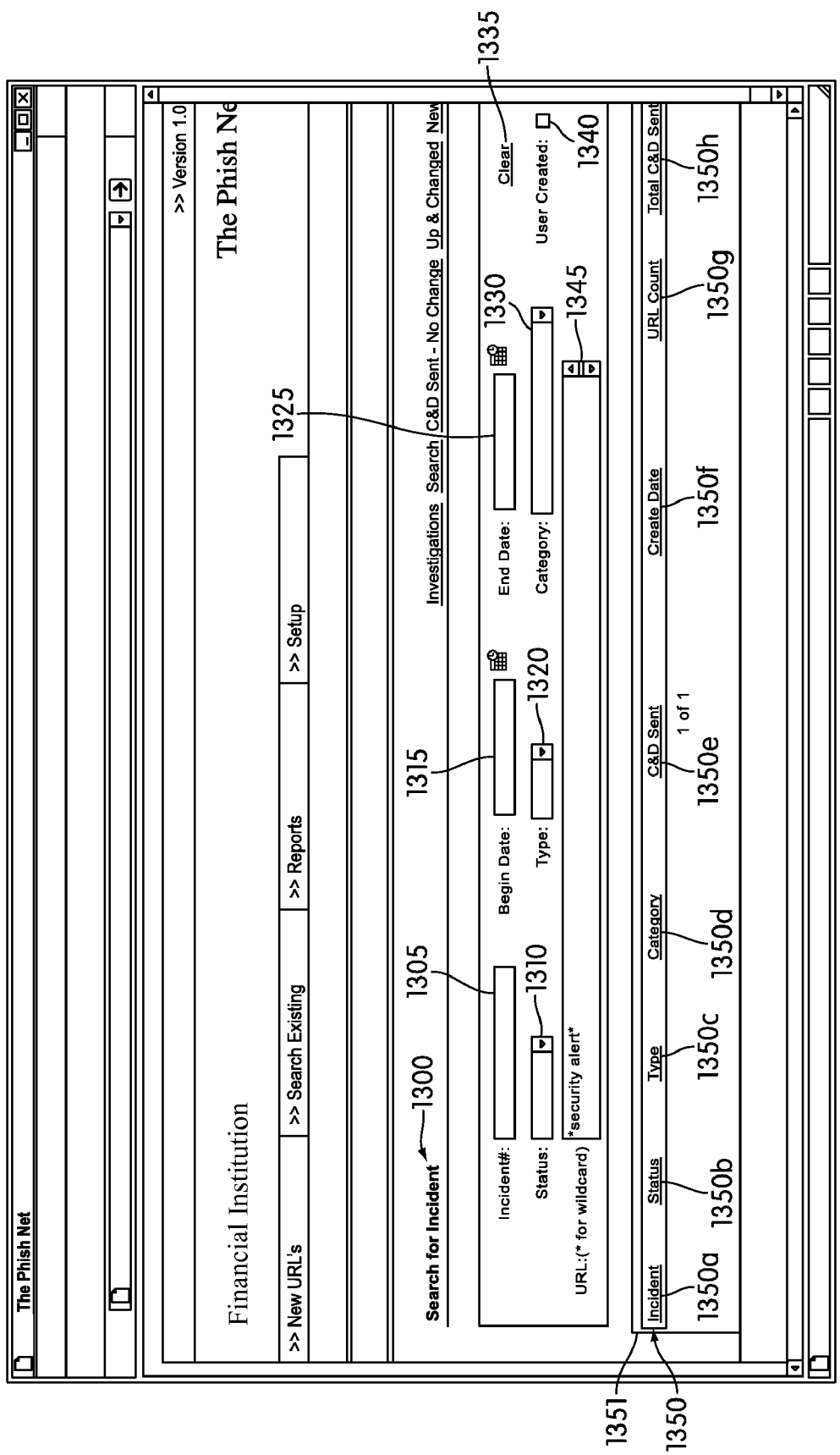
FIG. 13 illustrates a user interface displaying a form that allows a user to search a database containing records relating to one or more suspicious websites.

FIG. 13 illustrates a user interface displaying a form that allows a user to search a database containing records relating to one or more suspicious websites. As similar to the other user interfaces described herein, the user interface may, in one or more configurations, be implemented in the form of a dynamic webpage, and may include one or more hyperlinks. The user interface may include a search form 1300. Search form 1300 may comprise various fields, such as, for example, an incident number textbox 1305, a start date textbox 1315, an end date textbox 1325, a status pull-down menu 1310, a type pull-down menu 1320, a category pull-down menu 1330, a URL textbox 1345, a clear hyperlink 1335, and a user-created checkbox 1340. Search form 1300 may further comprise a search results field 1351. Search results field 1351 may include a results header bar 1350, which may include various column headings, such as, for example, incident heading 1350a, status heading 1350b, type heading 1350c, category heading 1350d, cease and desist heading 1350e, create date heading 1350f, count heading 1350g, and total letters sent heading 1350h. Search form 1300 may allow a user to search a database containing records relating to one or more suspicious websites. For example, a user may enter and/or edit values in the various fields of search form 1300, and then execute a key command and/or activate a hyperlink or button to perform a search of the database. In this manner, specific records matching a certain criteria may be located.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements of the other embodiments. It will also be appreciated and understood that modifications may be made without departing from the true spirit and scope of the present invention. The description is thus to be regarded as illustrative instead of restrictive on the present invention.

We claim:

1. A method, comprising:
    receiving, by a computing device, an electronic message, the electronic message including a first address of a suspicious network site;
    parsing, by the computing device, the electronic message to determine the first address of the suspicious network site;
    determining, by the computing device, whether the first address matches one or more previously stored addresses in a database;
    in response to determining that the first address does not match the one or more previously stored addresses in the database, displaying, by the computing device, a first user interface prompting a user to classify the suspicious network site in accordance with one or more classification criteria;

continuously monitoring, by the computing device, the suspicious network site over a predefined period of time;

based on the monitoring, determining, by the computing device, whether a status of the suspicious network site has changed during the predefined period of time;

in response to determining that the status of the suspicious network site has changed, determining, by the computing device, whether one or more attributes of the suspicious network site matches the one or more classification criteria;

in response to determining that the one or more attributes of the suspicious network site matches the one or more classification criteria, determining, by the computing device, whether the one or more classification criteria are indicative of a legitimate site;

displaying, by the computing device, a second user interface that includes one or more controls enabling the user to identify one or more entities responsible for the suspicious network site; and displaying, by the computing device, a third user interface that includes an email template enabling the user to create, based on the email template, at least one cease and desist letter to be sent to the one or more entities responsible for the suspicious network site.

2. The method of claim 1, further comprising:
comparing the suspicious network site to information about one or more known fraudulent sites to assess a probability that the suspicious network site is fraudulent.

3. The method of claim 1, further comprising:
comparing the first address of the suspicious network site to an address corresponding to a known fraudulent site.

4. The method of claim 1, further comprising:
in response to determining that the first address matches the one or more previously stored addresses in the database, associating the electronic message with one or more unique identifiers corresponding to the one or more previously stored addresses.

5. The method of claim 1, further comprising:
in response to determining that the first address does not match the one or more previously stored addresses in the database, associating the electronic message with a new unique identifier corresponding to the first address, the new unique identifier being different from one or more unique identifiers corresponding to the one or more previously stored addresses.

6. The method of claim 1, further comprising:
in response to determining that the status of the suspicious network site has not changed during the predefined period of time, automatically sending at least one cease and desist letter to an entity determined to be an owner of the suspicious network site.

7. At least one non-transitory computer-readable medium having computer-executable instructions stored thereon that, when executed, cause at least one computing device to:
receive an electronic message, the electronic message including a first address of a suspicious network site;
parse the electronic message to determine the first address of the suspicious network site;
determine whether the first address matches one or more previously stored addresses in a database;
in response to determining that the first address does not match the one or more previously stored addresses in the database, display a first user interface prompting a user to classify the suspicious network site in accordance with one or more classification criteria;
access the suspicious network site multiple times on a predetermined interval;
determine, based on an algorithm, whether a status of the suspicious network site has changed during the predetermined interval;
in response to determining that the status of the suspicious network site has changed, determine whether one or more attributes of the suspicious network site matches the one or more classification criteria;
in response to determining that the one or more attributes of the suspicious network site matches the one or more classification criteria, determine whether the one or more classification criteria are indicative of a legitimate site;
display a second user interface that includes one or more controls enabling the user to identify one or more entities responsible for the suspicious network site; and
display a third user interface that includes an email template enabling the user to create, based on the email template, at least one cease and desist letter to be sent to the one or more entities responsible for the suspicious network site.

8. The at least one non-transitory computer-readable medium of claim 7, having additional computer-executable instructions stored thereon that, when executed, further cause the at least one computing device to:
compare the suspicious network site to information about one or more known fraudulent websites in order to assess a probability that the suspicious network site is fraudulent.

9. The at least one non-transitory computer-readable medium of claim 7, having additional computer-executable instructions stored thereon that, when executed, further cause the at least one computing device to:
compare the first address of the suspicious network site to an address corresponding to a known fraudulent website.

10. The at least one non-transitory computer-readable medium of claim 7, having additional computer-executable instructions stored thereon that, when executed, further cause the at least one computing device to:
in response to determining that the first address matches the one or more previously stored addresses in the database, associate the electronic message with one or more unique identifiers corresponding to the one or more previously stored addresses.

11. The at least one non-transitory computer-readable medium of claim 7, having additional computer-executable instructions stored thereon that, when executed, further cause the at least one computing device to:
in response to determining that the first address does not match the one or more previously stored addresses in the database, associate the electronic message with a new unique identifier corresponding to the first address, the new unique identifier being different from one or more unique identifiers corresponding to the one or more previously stored addresses.

12. The at least one non-transitory computer-readable medium of claim 7, having additional computer-executable instructions stored thereon that, when executed, further cause the at least one computing device to:
in response to determining that the status of the suspicious network site has not changed during the predetermined interval, automatically send at least one cease and desist letter to an entity determined to be an owner of the suspicious network site.

13. An apparatus, comprising:

at least one processor; and memory storing computer readable instructions that, when executed by the at least one processor, cause the apparatus to:
- receive an electronic message, the electronic message including a first address of a suspicious network site;
- parse the electronic message to determine the first address of the suspicious network site;
- determine whether the first address matches one or more previously stored addresses in a database;
- in response to determining that the first address does not match the one or more previously stored addresses in the database, display a first user interface prompting a user to classify the suspicious network site in accordance with one or more classification criteria;
- access the suspicious network site multiple times on a predetermined interval;
- determine, based on an algorithm, whether a status of the suspicious network site has changed during the predetermined interval;
- in response to determining that the status of the suspicious network site has changed, determine whether one or more attributes of the suspicious network site matches the one or more classification criteria;
- in response to determining that the one or more attributes of the suspicious network site matches the one or more classification criteria, determine whether the one or more classification criteria are indicative of a legitimate site;
- display a second user interface that includes one or more controls enabling the user to identify one or more entities responsible for the suspicious network site; and
- display a third user interface that includes an email template enabling the user to create, based on the email template, at least one cease and desist letter to be sent to the one or more entities responsible for the suspicious network site.

14. The apparatus of claim 13, wherein the memory stores additional computer readable instructions that, when executed by the at least one processor, further cause the apparatus to:
- compare the suspicious network site to information about one or more known fraudulent websites in order to assess a probability that the suspicious network site is fraudulent.

15. The apparatus of claim 13, wherein the memory stores additional computer readable instructions that, when executed by the at least one processor, further cause the apparatus to:
- compare the first address of the suspicious network site to an address corresponding to a known fraudulent website.

16. The apparatus of claim 13, wherein the memory stores additional computer readable instructions that, when executed by the at least one processor, further cause the apparatus to:
- in response to determining that the first address matches the one or more previously stored addresses in the database, associate the electronic message with one or more unique identifiers corresponding to the one or more previously stored addresses.

17. The apparatus of claim 13, wherein the memory stores additional computer readable instructions that, when executed by the at least one processor, further cause the apparatus to:
- in response to determining that the first address does not match the one or more previously stored addresses in the database, associate the electronic message with a new unique identifier corresponding to the first address, the new unique identifier being different from one or more unique identifiers corresponding to the one or more previously stored addresses.

18. The apparatus of claim 13, wherein the memory stores additional computer readable instructions that, when executed by the at least one processor, further cause the apparatus to:
- in response to determining that the status of the suspicious network site has not changed during the predetermined interval, automatically send at least one cease and desist letter to an entity determined to be an owner of the suspicious network site.

* * * * *